(12) United States Patent
Choi et al.

(10) Patent No.: US 12,287,968 B2
(45) Date of Patent: Apr. 29, 2025

(54) APPARATUS AND METHOD FOR SANITIZING A SHARED MEMORY DEVICE OR A MEMORY EXPANDER

(71) Applicant: SK hynix Inc., Icheon-si (KR)

(72) Inventors: Jung Min Choi, Icheon-si (KR); Sun Woong Kim, Icheon-si (KR); Byung Il Koh, Icheon-si (KR); Min Ho Ha, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 35 days.

(21) Appl. No.: 18/335,895

(22) Filed: Jun. 15, 2023

(65) Prior Publication Data

US 2024/0231615 A1 Jul. 11, 2024

(30) Foreign Application Priority Data

Jan. 9, 2023 (KR) .................. 10-2023-0002701

(51) Int. Cl.
*G06F 3/06* (2006.01)

(52) U.S. Cl.
CPC .......... *G06F 3/0608* (2013.01); *G06F 3/0631* (2013.01); *G06F 3/0652* (2013.01); *G06F 3/0659* (2013.01)

(58) Field of Classification Search
CPC .... G06F 3/0608; G06F 3/0631; G06F 3/0652; G06F 3/0659; G06F 13/1668; G06F 13/4221; G06F 2213/0026
See application file for complete search history.

(56) References Cited

U.S. PATENT DOCUMENTS

| | | | |
|---|---|---|---|
| 2021/0117117 A1* | 4/2021 | Mahesh | G06F 3/0608 |
| 2021/0193200 A1* | 6/2021 | Khakifirooz | G11C 7/12 |
| 2021/0288048 A1* | 9/2021 | Chuang | H01L 21/823462 |

OTHER PUBLICATIONS

Compute Express Link™ (CXL™) 2.0 Specification: Memory Pooling—Questions from the Webinar Part 1.

* cited by examiner

*Primary Examiner* — Kenneth M Lo
*Assistant Examiner* — Alexander Vinnitsky

(57) ABSTRACT

A memory system includes at least one memory device that includes memory areas. The memory system includes a device allocation manager and security erase circuitry. The device allocation manager determines which of the memory areas is allocated or released based on a request input from at least one host. The security erase circuitry stores a security erase task for a first memory area, which is associated with a release determined by the device allocation manager, in an erase job queue, and removes the security erase task from the erase job queue when the first memory area is reallocated to a first host to which the first memory area was allocated before the release.

20 Claims, 8 Drawing Sheets

APPARATUS AND METHOD FOR SANITIZING A SHARED MEMORY DEVICE OR A MEMORY EXPANDER

CROSS-REFERENCE TO RELATED APPLICATIONS

This patent application claims the benefit of priority under 35 U.S.C. § 119(a) to Korean Patent Application No. 10-2023-0002701, filed on Jan. 9, 2023 in the Korean Intellectual Property Office, the entire disclosure of which is incorporated herein by reference.

TECHNICAL FIELD

One or more embodiments of the present disclosure described herein relate to a memory device, and more particularly, to an apparatus and a method for controlling a shared memory device, or a memory expander, coupled as an external device to a plurality of computing devices.

BACKGROUND

The amount of computation in a computing system increases in response to user's needs. Due to the increase in the amount of computation, the amount of data generated or stored in a storage is also increasing. While the amount of data increases, the space for storing data in the computing system might be limited. A memory expander, or a shared memory device, could be used to store a significant amount of data and avoid degradation in computing power and performance of the computing system. The memory expander can be understood as a composable infrastructure to overcome resource limitations in the computing system. If the computing system and the memory expander perform high-speed data communication, they could support an operation of high-intensity workloads that occur in fields of big data and machine learning.

BRIEF DESCRIPTION OF THE DRAWINGS

The description herein makes reference to the accompanying drawings wherein like reference numerals refer to like parts throughout the figures.

DETAILED DESCRIPTION

Figure 1:
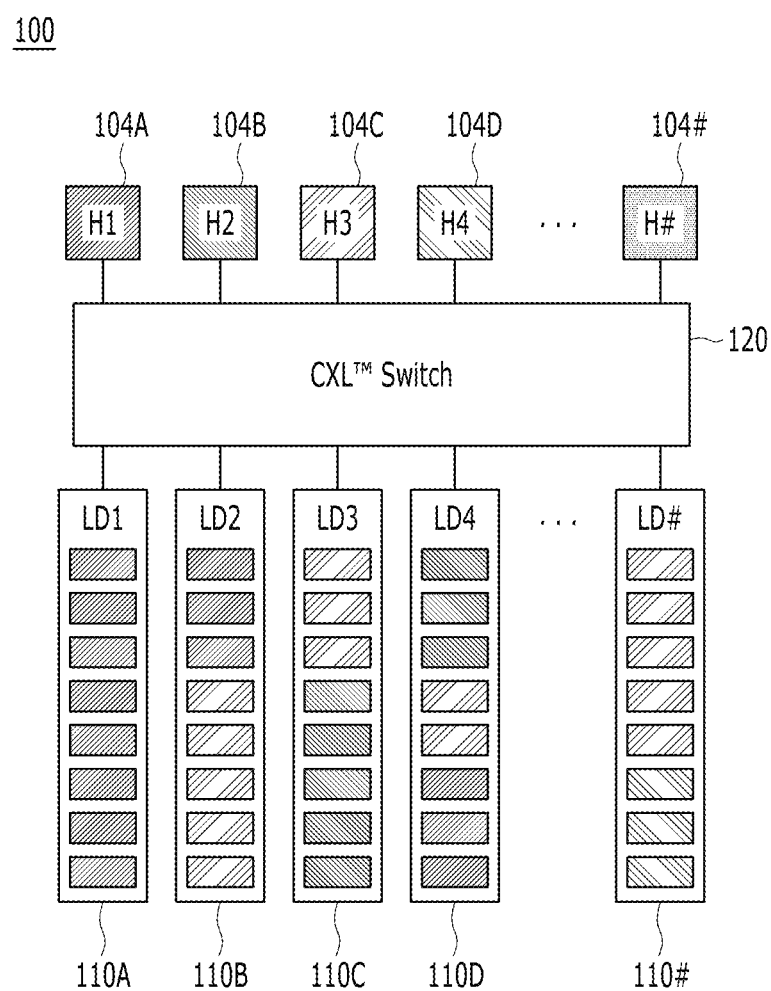
FIG. 1 describes an example of data infrastructure according to an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components e.g., an interface unit, circuitry, etc.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational, e.g., is not turned on nor activated. Examples of block/unit/circuit/component used with the "configured to" language include hardware, circuits, memory storing program instructions executable to implement the operation, etc. Additionally, "configured to" can include a generic structure, e.g., generic circuitry, that is manipulated by software and/or firmware, e.g., an FPGA or a general-purpose processor executing software to operate in manner that is capable of performing the task(s) at issue. "Configured to" may also include adapting a manufacturing process, e.g., a semiconductor fabrication facility, to fabricate devices, e.g., integrated circuits that are adapted to implement or perform one or more tasks.

As used in this disclosure, the term 'machine,' 'circuitry' or 'logic' refers to all of the following: (a) hardware-only circuit implementations such as implementations in only analog and/or digital circuitry and (b) combinations of circuits and software and/or firmware, such as (as applicable): (i) to a combination of processor(s) or (ii) to portions of processor(s)/software including digital signal processor(s), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'machine,' 'circuitry' or 'logic' applies to all uses of this term in this application, including in any claims. As a further example, as used in this application, the term 'machine,' 'circuitry' or 'logic' also covers an implementation of merely a processor or multiple processors or portion of a processor and its (or their) accompanying software and/or firmware. The term 'machine,' 'circuitry' or 'logic' also covers, for example, and if applicable to a particular claim element, an integrated circuit for a storage device.

As used herein, the terms 'first,' 'second,' 'third,' and so on are used as labels for nouns that they precede, and do not imply any type of ordering, e.g., spatial, temporal, logical, etc. The terms 'first' and 'second' do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term 'based on' is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

An embodiment of the present invention can provide an apparatus and a method for improving performance of a shared memory device or a memory expander.

In an embodiment of the present invention, a memory system can include at least one memory device including a plurality of memory areas; a device allocation manager configured to determine which of the plurality memory areas is allocated or released based on a request input from at least one host; and security erase circuitry configured to store a security erase task for a first memory area, which is associated with a release determined by the device allocation manager, in an erase job queue, and to remove the security erase task from the erase job queue when the first memory area is reallocated to a first host to which the first memory area was allocated before the release.

When the device allocation manager can determine allocation of the first memory area to a second host, the device allocation manager notifies the second host that the first memory area is allocated after the security erase circuitry completes the security erase task for the first memory area.

The memory system can further include a plurality of Compute Express Link (CXL™) endpoints, each endpoint selectively coupled to the at least one host.

The number of the plurality of CXL™ endpoints can be the same as the number of PCI-PCI bridges (PPBs) included in a Compute Express Link (CXL™) switch coupled to both the memory system and the at least one host.

The device allocation manager can be configured to transfer a message input through the plurality of CXL™ endpoints into a memory device corresponding to an identifier included in the message.

The security erase circuitry can be configured to perform a security erase task in a memory device when the memory device does not perform a data input/output operation.

The security erase circuitry can be configured to sequentially determine whether to execute, or delay, plural security erase tasks stored in the erase job queue and change an execution sequence of the plural security erase tasks.

The device allocation manager can include a memory section table that records whether each of the plurality of memory areas or sections included in the at least one memory device is allocated to the at least one host. A size of the plurality of memory areas allocated to the at least one host can be determined based on a request input from the at least one host.

The at least one memory device can include the plurality of memory areas allocated to a plurality of hosts.

In another embodiment of the present invention, a fabric manager can be coupled to at least one host and at least one logical device. The fabric manager can include a device allocation manager configured to determine which of a plurality of memory areas in the at least one logical device is allocated or released based on a request input from the at least one host; and security erase circuitry configured to store a security erase task for a first memory area included in the at least one logical device, which is associated with a release determined by the device allocation manager, in an erase task queue, and to remove the security erase task from the erase task queue when the first memory area is reallocated to a first host to which the first memory area was allocated before the release.

When the device allocation manager can determine allocation of the first memory area to a second host, the device allocation manager notifies the second host that the first memory area is allocated after the security erase circuitry completes the security erase task for the first memory area.

The security erase circuitry can be configured to recognize a first logical device including the first memory area from among the at least one logical device and to determine whether to carry out the security erase task for the first memory area based on a connection state of a PCI-PCI bridge (PPB) corresponding to the first logical device.

The security erase circuitry can be configured to perform a security erase task in the at least one logical device when the at least one logical device does not perform a data input/output operation.

The security erase circuitry can be configured to sequentially determine whether to execute, or delay, plural security erase tasks stored in the erase task queue and to change an execution sequence of the plural security erase tasks accordingly.

The device allocation manager can include a memory area table that records whether each of the plurality of memory areas included in the at least one logical device is allocated to the at least one host. The device allocation manager can control a connection relationship between at least one virtual PCI-PCI bridge (vPPB) and at least one PCI-PCI bridge (PPB) in a Compute Express Link (CXL™) switch based on the memory area table.

In another embodiment of the present invention, a data processing system can include a plurality of hosts, each host including a root port; and a memory system comprising: a plurality of Compute Express Link (CXL™) endpoints corresponding to root ports of the plurality of hosts; a device allocation manager configured to determine which of a plurality of memory areas is allocated or released based on a request input from the at least one host; and security erase circuitry configured to store a security erase task for a first memory area included in the at least one logical device, which is associated with a release determined by the device allocation manager, in an erase job queue, and to remove the security erase task from the erase job queue when the first memory area is reallocated to a first host to which the first memory area was allocated before the release.

When the device allocation manager determines allocation of the first memory area to a second host, the device allocation manager can notify the second host that the first memory area is allocated after the security erase circuitry completes the security erase task for the first memory area.

The device allocation manager can be configured to transfer a message input through the plurality of CXL™ endpoints into a memory device corresponding to an identifier included in the message.

The security erase circuitry can be configured to perform a security erase task in the at least one logical device when the at least one logical device does not perform a data input/output operation.

The device allocation manager can include a memory section table that records whether each of the plurality of memory areas included in the at least one memory device is allocated to the at least one host. A size of the plurality of memory areas allocated to the at least one host can be determined based on a request input from the at least one host.

Embodiments will now be described with reference to the accompanying drawings, wherein like numbers reference like elements.

FIG. 1 describes an example of data infrastructure according to an embodiment of the present disclosure. Specifically, FIG. 1 describes a Compute Express Link (CXL™) switch and a Compute Express Link (CXL™) interface.

In FIG. 1, a data processing apparatus 100 is shown as a first example of a data infrastructure. The data processing apparatus 100 can include a plurality of host processors 104A, 104B, 104C, 104D, . . . , 104 # and a plurality of logical devices 110A, 110B, 110C, 110D, . . . , 110 #. The plurality of host processors 104A, 104B, 104C, 104D, . . . , 104 # and the plurality of logical devices 110A, 110B, 110C, 110D, . . . , 110 # may be connected by a CXL™ switch 120.

Data infrastructure may refer to a digital infrastructure that promotes data sharing and consumption. Like other infrastructures, the data infrastructure can include structures, services, and facilities that are necessary for data sharing and consumption. For example, the data infrastructure includes a variety of components, including hardware, software, networking, services, policies, and etc. that enable data consumption, storage, and sharing. The data infrastructure can provide a foundation for creating, managing, using, and protecting data.

For example, data infrastructure can be divided into physical infrastructure, information infrastructure, business infrastructure, and the like. The physical infrastructure may include a data storage device, a data processing device, an input/output network, a data sensor facility, and the like. The information infrastructure may include data repositories such as business applications, databases, and data warehouses, virtualization systems, and cloud resources and services including virtual services, and the like. The business infrastructure may include business intelligence (BI) systems and analytics tools systems such as big data, artificial intelligence (AI), machine learning (ML), and the like.

A plurality of hosts (e.g., 102A, 102B shown in FIGS. 3-4 and 6-8) may be understood as computing devices such as personal computers and workstations. For example, a first host (Host 1, 102A) may include a host processor (e.g., H1, 104A), a host memory, and a storage device. The host processor (H1, 104A) may perform data processing operations in response to the user's needs, temporarily store data used or generated in the process of performing the data processing operations in the host memory as an internal volatile memory, or permanently store the data in the storage device as needed.

When a user performs tasks that require many high speed operations, such as calculations or operations related to artificial intelligence (AI), machine learning (ML), and big data, resources such as a host memory and a storage device included in a host system might be not sufficient. A shared memory device coupled to the host system may be used to overcome a limitation of internal resources such as the host memory and the storage device.

Referring to FIG. 1, the CXL™ switch 120 can couple the plurality of host processors 104A, 104B, 104C, 104D, . . . , 104 # and the plurality of logical devices 110A, 110B, 110C, 110D, . . . , 110 # to each other. According to an embodiment, some of host processors could constitute a single system. In another embodiment, each host processor could be included in a distinct and different system. Further, according to an embodiment, some of logical devices could constitute a single shared memory device. In another embodiment, each logical device could be included in a distinct and different shared memory device.

A data storage area included in the plurality of logical devices 110A, 110B, 110C, 110D, . . . , 110 # can be exclusively assigned or allocated to the plurality of host processors 104A, 104B, 104C, 104D, . . . , 104 #. For example, the entire storage space of the storage LD1 of first logical device 110A may be exclusively allocated to and used by the first host processor 104A. That is, another host processor might be not access the storage LD1 in first logical device 110A while the storage LD1 is allocated to the first host processor 104A. A partial storage space in the storage LD2 of second logical device 110B may be allocated to the first host processor 104A, while another portion therein may be allocated to the third host processor 104C. In addition, a partial storage space in the storage LD2 of second logical device 110B might be not used by another host processor except for the storage LD2 of second logical device. The storage LD3 of third logical device 110C may be allocated to, and used by, the second host processor 104B and the third host processor 104C. The storage LD4 of fourth logical device 110D may be allocated to, and used by, the first host processor 104A, the second host processor 104B, and the third host processor 104C.

In the plurality of logical devices 110A, 110B, 110C, 110D, . . . , 110 #, unallocated storage spaces can be further allocated to the plurality of host processors 104A, 104B, 104C, 104D, . . . , 104 # based on a request of the plurality of host processors 104A, 104B, 104C, 104D, . . . , 104 #. Further, the plurality of host processors 104A, 104B, 104C, 104D, . . . , 104 # can request deallocation or release of the previously allocated storage space. In response to the request of the plurality of host processors 104A, 104B, 104C, 104D, . . . , 104 #, the CXL™ switch 120 may control connection or data communication between the plurality of host processors 104A, 104B, 104C, 104D, . . . , 104 # and the plurality of logical devices 110A, 110B, 110C, 110D, . . . , 110 #.

Referring to FIG. 1, the plurality of host processors 104A, 104B, 104C, 104D, . . . , 104 # may the same component, but their internal components may be changed according to an embodiment. In addition, the plurality of logical devices 110A, 110B, 110C, 110D, . . . , 110 # may include the same component, but their internal components may be changed according to an embodiment.

According to an embodiment, the CXL™ switch 120 can be configured to utilize the plurality of logic devices 110A, 110B, 110C, 110D, . . . , 110 # to provide versatility and scalability of resources, so that the plurality of host processors 104A, 104B, 104C, 104D, . . . , 104 # can overcome limitations of internal resources. Herein, Compute Express Link (CXL™) is a type of interface which utilizes different types of devices more efficiently in a high-performance computing system such as artificial intelligence (AI), machine learning (ML), and big data. For example, when the plurality of logical devices 110A, 110B, 110C, 110D, . . . , 110 # includes a CXL™-based DRAM device, the plurality of host processors 104A, 104B, 104C, 104D, ..., 104 # may expanded memory capacity available for storing data.

If the CXL™ switch 120 provides cache consistency, there may be delays in allowing other processors to use variables or data updated by a specific processor in a process of sharing the variables or the data stored in a specific memory area. To reduce the delay in using the plurality of logical devices 110A, 110B, 110C, 110D, ..., 110 #, a Compute Express Link (CXL™) protocol or interface through the CXL™ switch 120 can assign a logical address range to memory areas in the plurality of logical devices 110A, 110B, 110C, 110D, ..., 110 #. The logical address range is used by the plurality of host processors 104A, 104B, 104C, 104D, ..., 104 #. Using a logical address in the logical address range, the plurality of host processors 104A, 104B, 104C, 104D, ..., 104 # can access the memory areas allocated to the plurality of host processors 104A, 104B, 104C, 104D, ..., 104 #. When each of the plurality of host processors 104A, 104B, 104C, 104D, ..., 104 # requests a storage space for a specific logical address range, an available memory area included in the plurality of logical devices 110A, 110B, 110C, 110D, ..., 110 # can be allocated for the specific logical address range. When each of the plurality of host processors 104A, 104B, 104C, 104D, ..., 104 # requests a memory area based on different logical addresses or different logical address ranges, memory areas in the plurality of logical devices 110A, 110B, 110C, 110D, ..., 110 # can be allocated for the different logical addresses or the different logical address ranges. If the plurality of host processors 104A, 104B, 104C, 104D, ..., 104 # does not use a same logical address range, however, then a variable or data assigned to a specific logical address might be not shared by the plurality of host processors 104A, 104B, 104C, 104D, ..., 104 #. Each of the plurality of host processors 104A, 104B, 104C, 104D, ..., 104 # can use the plurality of logical devices 110A, 110B, 110C, 110D, ..., 110 # as a memory expander so as to overcome limitations of their internal resources.

According to an embodiment, the plurality of logic devices 110A, 110B, 110C, 110D, ..., 110 # may include a controller and a plurality of memories. The controller could be connected to the CXL™ switch 120 and control the plurality of memories. The controller can perform data communication with the CXL™ switch (120) through a Compute Express Link (CXL™) interface. Further, the controller can perform data communication through a protocol and an interface supported by the plurality of memories. According to an embodiment, the controller may distribute data input/output operations transmitted to a shared memory device and manage power supplied to the plurality of memories in the shared memory device. Depending on an embodiment, the plurality of memories may include a dual in-line memory module (DIMM), a memory add-in card (AIC), a non-volatile memory device supporting various connections (e.g., EDSFF 1U Long (E1 L.), EDSFF 1U Short (E1 S.), EDSFF 3U Long (E3U Long), EDSF (E3U Short), etc.).

The memory areas included in the plurality of logical devices 110A, 110B, 110C, 110D, ..., 110 # may be allocated for, or assigned to, the plurality of host processors 104A, 104B, 104C, 104D, ..., 104 #. A size of memory area allocated for, or assigned to, the plurality of host processors 104A, 104B, 104C, 104D, ..., 104 # can be changed or modified in response to a request from the plurality of host processors 104A, 104B, 104C, 104D, ..., 104 #. In FIG. 1, it is shown that the plurality of host processors 104A, 104B, 104C, 104D, ..., 104 # is coupled to the plurality of logic devices 110A, 110B, 110C, 110D, ..., 110 # through the CXL™ switch 120. However, according to an embodiment, the memory areas included in the plurality of logical devices 110A, 110B, 110C, 110D, ..., 110 # may also be allocated for, or assigned to, a virtual machine (VM) or a container. Herein, a container is a type of lightweight package that includes application codes and dependencies such as programming language runtimes and libraries of a specific version required to run software services. The container could virtualize the operation system. The container can run anywhere from a private data center to a public cloud or even on a developer's personal laptop.

Figure 2:
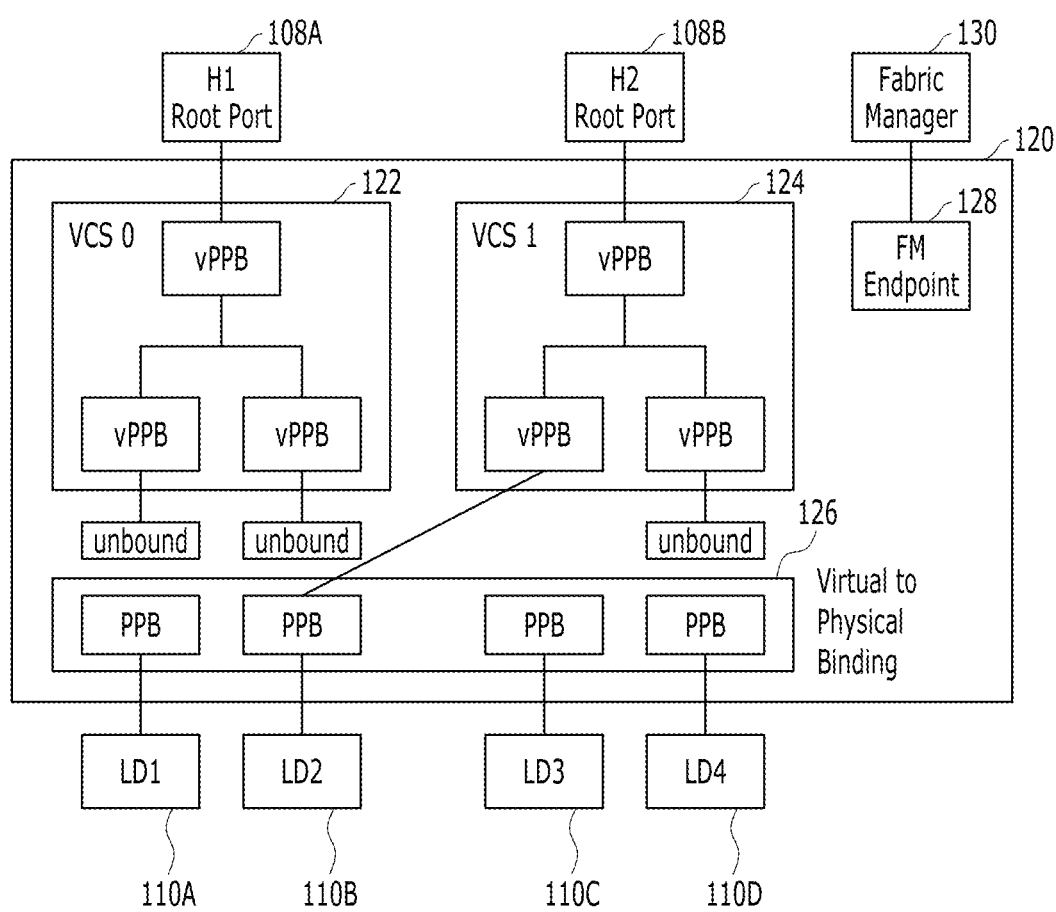
FIG. 2 describes an example of a Compute Express Link (CXL™) switch according to an of the present disclosure.

FIG. 2 describes an example of a Compute Express Link (CXL™) switch according to an of the present disclosure.

Referring to FIG. 2, a plurality of root ports 108A, 108B and a plurality of logic devices 110A, 110B, 110C, 110D may be coupled through a CXL™ switch 120.

According to an embodiment, the plurality of root ports 108A, 108B may be included in a root complex located between the plurality of logical devices 110A, 110B, 110C, 110D supporting a Compute Express Link (CXL™) interface and the plurality of host processors 104A, 104B, 104C, 104D, ..., 104 # shown in FIG. 1. The root complex is an interface located between the plurality of host processors 104A, 104B and a connection component such as a PCIe Bus. The root complex may include several components, several chips, system software, and the like, such as a processor interface, a DRAM interface, and the like. The root complex can logically combine hierarchical domains such as PCIe into a single hierarchy. Each fabric instance may include a plurality of logical devices, switches, bridges, and the like. The root complex can calculate a size of a storage space in each logical device and map the storage space to an operating system, to generate an address range table. According to an embodiment, the plurality of host processors 104A, 104B may be connected to different root ports 108A, 108B respectively to configure different host systems.

The root ports 108A, 108B may refer to a PCIe port included in the root complex that forms a part of PCIe interconnection hierarchy through a virtual PCI-PCI bridge which is coupled to the root ports 108A, 108B. Each of the root ports 108A, 108B may have a separate hierarchical area. Each hierarchical area may include one endpoint, or sub-hierarchies including one or more switches or a plurality of endpoints. Herein, an endpoint may refer to one end of the communication channel. The endpoint may be determined according to circumstances. For example, in a case of physical data communication, an endpoint may refer to a server or a terminal, which is the last device connected through a data path. In terms of services, an endpoint may indicate an Internet identifier (e.g., uniform resource identifiers, URIs) corresponding to one end of the communication channel used when using a service. An endpoint may also be an Internet identifier (URIs) that enables an Application Programming Interface (API), which is a set of protocols that allow two systems (e.g., applications) to interact or communicate with each other, to access resources on a server.

The CXL™ switch 120 is a device that can attach the plurality of logical devices 110A, 110B, 110C, 110D, which are multiple devices, to one root port 108A or 108B. The CXL™ switch 120 can operate like a packet router and recognize which path a packet should go through based on routing information different from an address of the packet. Referring to FIG. 2, the CXL™ switch 120 may include a plurality of bridges.

Here, Compute Express Link (CXL™) is a dynamic multi-protocol technology designed to support accelerators and memory devices. CXL™ can provide a set of protocols including protocols (e.g., CXL.io) that include PCIe-like I/O semantics, protocols (e.g., CXL.cache) that include caching protocol semantics, and protocols including memory access semantics over individual or on-package (on-package) links. Semantics may refer to prediction and ascertainment of what will happen and what the outcome will be to the meaning given by units such as expressions, sentences, and program codes when a program or an application, which is configured of a language which is a type of communication system governed by sentence generation rules in which elements are combined in various ways. For example, a first CXL™ protocol (CXL.io) can be used for search and enumeration, error reporting, and Host Physical Address (HPA) inquiry. A second CXL™ protocol (CXL.mem) and a third CXL™ protocol (CXL.cache) may be selectively implemented and used by a specific accelerator or a memory device usage model. The CXL™ interface can provide low-latency, high-bandwidth paths for an accelerator to access a system or for a system to access a memory connected to a CXL™ device.

The Compute Express Link (CXL™) switch 120 is an interconnect device for connecting the plurality of root ports 108A, 108B and the plurality of logic devices 110A, 110B, 110C, 110D supporting CXL™-based data communication. For example, the plurality of logic devices 110A, 110B, 110C, 110D may refer to a PCIe-based device or a logical device LD. Here, PCIe (i.e., Peripheral Component Interconnect Express) refers to a protocol or an interface for connecting a computing device and a peripheral device. Using a slot or a specific cable to connect a host such as a computing device to a memory system such as a peripheral device connected to the computing device, PCIe can have a bandwidth over several hundreds of MBs per second (e.g., 250 MB/s, 500 MB/s, 984.6250 MB/s, 1969 MB/s, etc.) by using a plurality of pins (e.g., 18, 32, 49, 82, etc.) and at least one wire (e.g., x1, x4, x8, x16). Using CXL™ switching and pooling, the plurality of host processors and the plurality of logical devices can be connected through the CXL™ switch 120, and all or a part of each logical device connected to the CXL™ switch 120 can be assigned as a logical device to several host processors. A logical device LD is an entity that refers to a CXL™ endpoint bound to a virtual CXL™ switch (VCS).

According to an embodiment, the logical device LD may include a single logical device (Single LD) or a multi-logical device (MLD). The plurality of logical devices 110A, 110B, 110C, 110D that support the Compute Express Link (CXL™) interface could be partitioned into up to 16 distinguished logical devices like a memory managed by the host. Each logical device can be identified by a logical device identifier LD-ID used in the first CXL™ protocol (CXL.io) and the second CXL™ protocol (CXL.mem). Each logical device can be identified in the virtual hierarchy (VH). A control logic or circuit included in each of the plurality of logic devices 110A, 110B, 110C, 110D may control and manage a common transaction and link layer for each protocol. For example, the control logic or circuit in the plurality of logic devices 110A, 110B, 110C, 110D can access various architectural functions, control, and status registers through an Application Programming Interface (API) provided by a fabric manager 130, so that the logic device LD can be configured statically or dynamically.

Referring to FIG. 2, the CXL™ switch 120 may include a plurality of virtual CXL™ switches 122, 124. The virtual CXL™ switches (VCS) 122 (VCS 0), 124 (VCS 1) may include entities within a physical switch belonging to a single virtual hierarchy (VH). Each entity may be identified using a virtual CXL™ switch identifier VCS-ID. The virtual hierarchy (VH) may include a rendezvous point (RP), a PCI-to-PCI bridge (PPB) 126, and an endpoint. The virtual hierarchy (VH) may include everything arranged under the rendezvous point (RP). The structure of the CXL™ virtual layer may be similar to that of PCIe. A port connected to a virtual PCI-PCI bridge (vPPB) and a PCI-PCI bridge (PPB) inside a CXL™ switch 120 controlled by the fabric manager (FM) 130 can provide or block connectivity in response to various protocols (PCIe, CXL™ 1.1, CXL™ 2.0 SLD, or CXL™ 2.0 MLD). Here, the fabric manager (FM) 130 can control an aspect of the system related to binding and management of pooled ports and devices. The fabric manager (FM) 130 can be considered a separate entity distinguished from a switch or host firmware. In addition, virtual PCI-PCI bridges (vPPBs) and PCI-PCI bridges (PPBs) controlled by the fabric managers (FM) 130 can provide data links including traffic from multiple virtual CXL™ switches (VCS) or unbound physical ports. Messages or signals by the fabric manager (FM) 130 can be delivered to a fabric manager endpoint 128 in the CXL™ switch 120, and the CXL™ switch 120 can control multiple switches or bridges included therein based on the message or signal delivered to the fabric manager endpoint 128.

According to an embodiment, the CXL™ switch 120 may include a PCI-PCI bridge PPB 126 corresponding to each of the plurality of logic devices 110A, 110B, 110C, 110D. The plurality of logic devices 110A, 110B, 110C, 110D may have a 1:1 correspondence relationship with the PCI-PCI bridge PPB 126. In addition, the CXL™ switch 120 may include a virtual PCI-PCI bridge (vPPB) corresponding to each of the plurality of root ports 108A, 108B. The plurality of root ports 108A, 108B and the plurality of virtual PCI-PCI bridges vPPB may have a 1:1 correspondence relationship. The CXL™ switch 120 may have a different configuration corresponding to the number of the plurality of root ports 108A, 108B and the number of the plurality of logic devices 110A, 110B, 110C, 110D.

Referring to FIG. 2, the fabric manager (FM) 130 may connect one virtual PCI-PCI bridge (vPPB) among the second virtual CXL™ switches 124 (VCS 1) with one PCI-PCI bridge (PPB) among PCI-PCI bridges (PPBs) 126 and unbind other virtual PCI-PCI bridges (vPPB) included in the first virtual CXL™ switches 122 (VCS 0) and the second virtual CXL™ switches 124 to any PCI-PCI bridge (PPB) among PCI-PCI bridges (PPBs) 126. That is, connectivity between the first virtual CXL™ switches 122, or the second virtual CXL™ switches 124, and the PCI-PCI bridges (PPBs) 126 may be achieved selectively. Like this configuration, the CXL™ switch 120 can perform a function of connecting a virtual layer to a physical layer (Virtual to Physical Binding).

Referring to FIGS. 1 and 2, the storage space (e.g., memory areas) in the plurality of logic devices 110A, 110B, 110C, 110D, . . . , 110 # may be shared by the plurality of host processors 104A, 104B, 104C, 104D, . . . , 104 #. For example, the storage space of the first logical device storage LD1 may be configured to store data corresponding to a logical address range of 1 to 100, and the storage space of the second logical device storage LD2 may be configured to store data corresponding to another logical address range of 101 to 200. The plurality of logical devices 110A, 110B, 110C, 110D can be accessed through logical addresses of 1 to 400. Further, the plurality of host processors 104A, 104B, 104C, 104D, . . . , 104 # can share access information regarding which host processor uses or accesses the storage space in the plurality of logical devices 110A, 110B, 110C, 110D based on the logical addresses of 1 to 400. For example, logical addresses of 1 to 50 may be assigned to, and allocated for, the first host processor 104A, and other logical addresses of 51 to 100 may be assigned to, and allocated for, the second host processor 104B. In addition, other logical addresses of 101 to 200 may be assigned to, and allocated for, the first host processor 104A.

A range of logical addresses assigned to each logical device may be different in response to a size of the storage space of the logical device included in the shared memory device. In addition, a storage space that has been allocated to the plurality of host processors 104A, 104B, 104C, 104D, . . . , 104 # may be released in response to a release request of the plurality of host processors 104A, 104B, 104C, 104D, . . . , 104 #.

Figure 3:
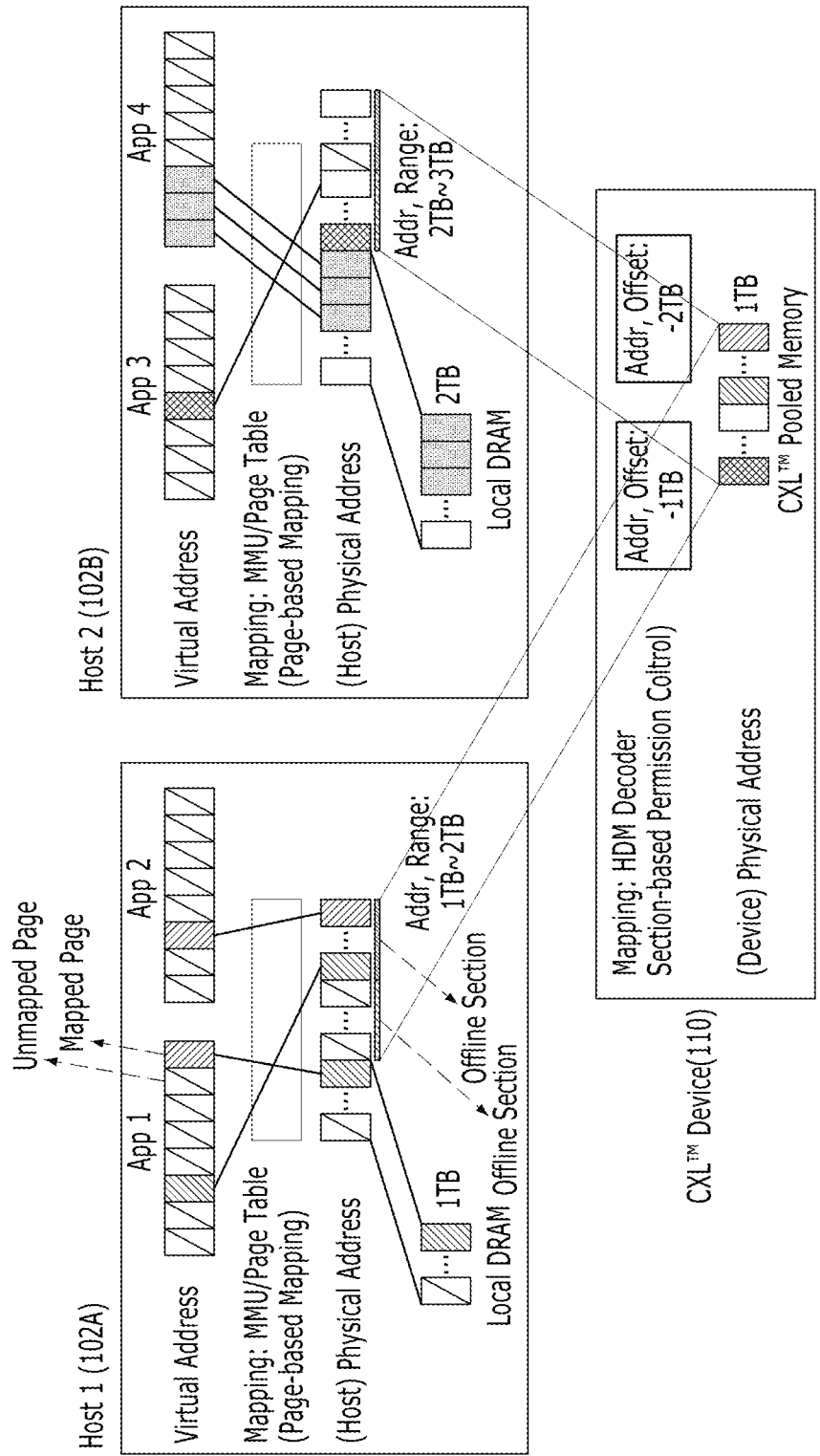
FIG. 3 describes an address translation method according to an embodiment of the present disclosure.

FIG. 3 describes an address translation method according to an embodiment of the present disclosure.

Referring to FIG. 3, a plurality of hosts 102A, 102B may be coupled to a single CXL™ device 110. Here, the CXL™ device 110 may correspond to the plurality of logic devices 110A, 110B, 110C, 110D, . . . , 110 # shown in FIGS. 1 and 2. According to an embodiment, the CXL™ device 110 can include a single logical device 110A or the plurality of logical devices 110A, 110B, 110C, 110D, . . . , 110 #.

A plurality of applications App1, App2 may be executed in a first host 102A. The plurality of applications App1, App2 may generate data and store the data in a memory, or load the stored data from the memory. The first host 102A may include an internal memory (e.g., Local DRAM). Because a storage space of the internal memory (e.g., Local DRAM) is limited, the first host 102A may use the CXL™ device 110 as necessary. For example, the first application App1 may use data corresponding to virtual addresses corresponding to two pages. One of the virtual addresses corresponding to the two pages may be mapped to a Host Physical Address of the internal memory (e.g., Local DRAM) included in the first host 102A by a memory management unit (MMU) included in the first host 102A. In addition, the Memory Management Unit (MMU) included in the first host 102A can map the other virtual address corresponding to the two pages to another range (e.g., the range of 1 TB to 2 TB) outside a range of the Host Physical Address (e.g., an address range corresponding to a size of 1 TB) of the internal memory (e.g., Local DRAM). The data mapped to the range (e.g., the range of 1 TB to 2 TB) beyond the range of the Host Physical Address of the internal memory (e.g., Local DRAM) included in the first host 102A may be transferred to, and stored in, the CXL™ device 110.

According to an embodiment, the memory management unit (MMU) included in the first host 102A may perform a page-based address mapping. A virtual address used by the plurality of applications App1, App2 and the memory management device MMU may be established on a page basis. However, an address may be set on a basis of different units (e.g., sectors, etc.), according to an embodiment.

In addition, the second application App2 performed on the first host 102A may use data corresponding to a virtual address corresponding to a single page. The memory management unit MMU included in the first host 102A may map the virtual address to another range (e.g., an address range corresponding to a size of 1 TB to 2 TB) outside the range of the Host Physical Address (e.g., an address range corresponding to a size of 1 TB) of the internal memory (e.g., Local DRAM). Accordingly, the data used by the second application App2 may be transferred to, and stored in, the CXL™ device 110.

Meanwhile, a plurality of other applications App3, App4 may be executed in the second host 102B. The third application App3 may use data corresponding to a virtual address corresponding to one page, and the fourth application App4 may use data corresponding to a virtual address corresponding to three pages. The memory management unit MMU included in the second host 102B can map the virtual address corresponding to the three pages used by the fourth application App4 to the physical address range of the internal memory (e.g., the address range corresponding to the size of 2 TB) included in the second host 102B. However, the memory management unit MMU included in the second host 102B can map the virtual address associated with the data used by the third application App3 to another range (e.g., an address range corresponding to a size of 2 TB to 3 TB) beyond the physical address range of the internal memory (e.g., the address range corresponding to the size of 2 TB). In this case, the data corresponding to the virtual address used by the third application App3 may be, transferred to, and stored in, the CXL™ device 110.

Each of the first host 102A and the second host 102B has an internal memory (e.g., Local DRAM), and the respective internal memories have storage areas of different sizes or capabilities. However, the first host 102A and the second host 102B may be connected to the CXL™ device 110 to use or access additionally allocated memory areas that exceed the storage capacity of the internal memory (e.g., Local DRAM). According to an embodiment, each of the first host 102A and the second host 102B may request as much memory area as necessary from the CXL™ device 110. For example, the first host 102A may request a memory area of 3 TB, and the second host 102B may request a memory area of 1 TB. The CXL™ device 110 may allocate, or release, a memory area in response to requests from the first host 102A and the second host 102B.

According to an embodiment, the CXL™ device 110 may include a Host-managed Device Memory (HDM) decoder or a Private Device Memory (PDM) decoder. The Host-Managed Device Memory (HDM) is a type of device-attached memory that can be mapped into a system-coherent address space and accessible to a host using a standard post-entry semantic scheme. The memory areas included in the CXL™ device 110 can be mapped through an HDM decoder. In addition, the personal device memory (PDM) is a type of device-attached memory that is not mapped to a system address space or cannot be directly accessed by a host as a cacheable memory. For example, a memory in a PCIe device might be considered a personal device memory (PDM). The memory area included in the CXL™ device 110 may be mapped through the PDM decoder. The host-managed device memory (HDM) and the personal device memory (PDM) are compatible with each other in the CXL™ device 110. According to an embodiment, the host-managed device memory (HDM) decoder and the private device memory (PDM) decoder may also be compatible with each other for using the CXL™ device 110.

The Host-managed Device Memory (HDM) decoder or the PDM (Private Device Memory) decoder can convert a Host Physical Address (HPA) into a Device Physical Address (DPA). The applications App1, App2, App3, App4 running on hosts 102A, 102B can use a virtual address. The virtual address can be converted into a host physical address (HPA) by a memory management unit (MMU). Then, the host physical address (HPA) can be converted by the host-managed device memory (HDM) decoder or the private device memory (PDM) decoder to a device physical address (DPA), which can point to an allocated memory area in the CXL™ device 110 when the host physical address (HPA) exceeds a physical address range of the internal memory (e.g., Local DRAM). In addition, when connected to multiple host interfaces (e.g., the plurality of root ports), the Host-managed Device Memory (HDM) decoder or the Private Device Memory (PDM) decoder may support interleaving for memory areas.

Figure 4:
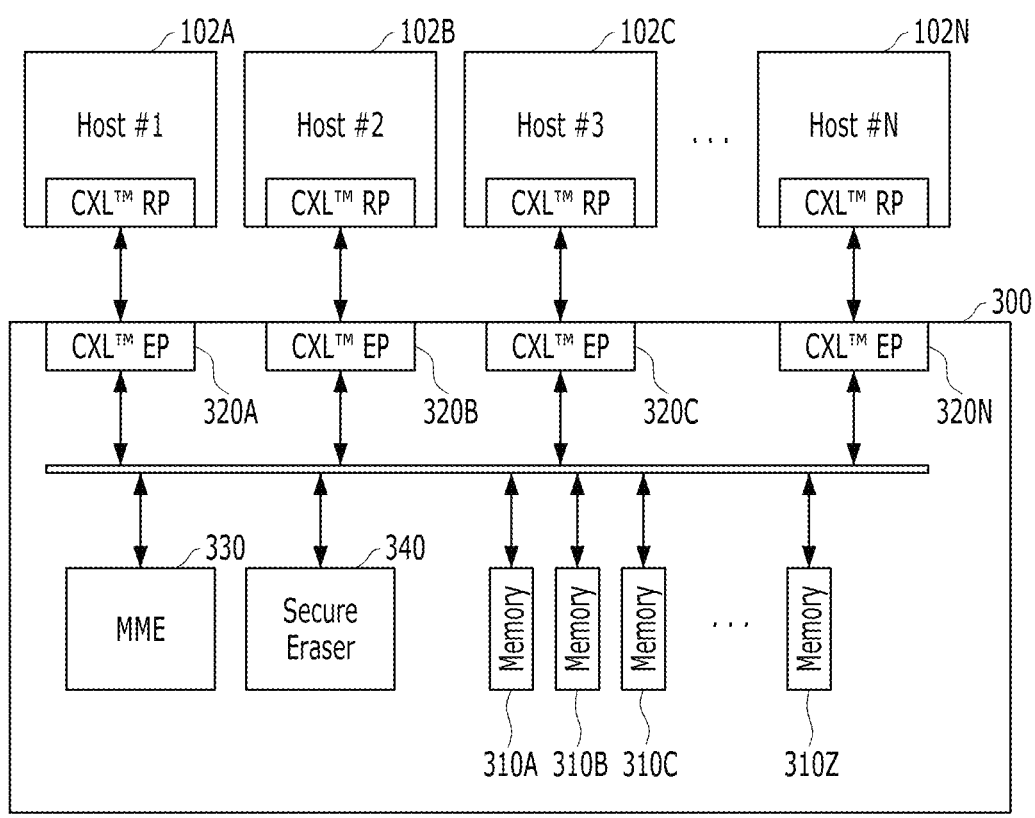
FIG. 4 illustrates a memory system according to an embodiment of the present disclosure.

FIG. 4 illustrates a memory system according to an embodiment of the present disclosure.

Referring to FIG. 4, a memory system 300 may be connected to a plurality of hosts 102A, 102B, 102C, ..., 102N. Each of the plurality of hosts 102A, 102B, 102C, ..., 102N may include a CXL™ Root Port (CXL™ RP). The memory system 300 may include a plurality of CXL™ endpoints (CXL™ Eps) 320A, 320B, 320C, ..., 320N corresponding to the CXL™ root port (CXL™ RP) included in the plurality of hosts 102A, 102B, 102C, ..., 102N. In FIG. 4, the plurality of CXL™ endpoints (CXL™ Eps) included in the memory system 300 are coupled to CXL™ root ports (CXL™ RPs) in a 1:1 correspondence relationship. According to an embodiment, a connection relationship between the plurality of CXL™ endpoints (CXL™ EPs) and the plurality of CXL™ root ports (CXL™ RP) may vary. For example, the CXL™ switch 120 described in FIGS. 1 and 2 can be disposed between the plurality of endpoints (CXL™ EPs) and the plurality of CXL™ root ports (CXL™ RPs) to control the connection therebetween.

The memory system 300 may include a plurality of memory devices 310A, 310B, 310C, ..., 310Z. According to an embodiment, each of the plurality of memory devices 310A, 310B, 310C, ..., 310Z may be partitioned into a plurality of memory areas as plural logical devices. The memory system 300 may correspond to the CXL™ device 110 described in FIG. 3. The memory system 300 may allocate, or release, the plurality of memory areas included in the plurality of memory devices 310A, 310B, 310C, ..., 310Z in response to a request from the plurality of hosts 102A, 102B, 102C, ..., 102N. According to an embodiment, at least some of the plurality of memory devices 310A, 310B, 310C, ..., 310Z) can include plural memory areas allocated to at least two hosts 102A, 102B, 102C, ..., 102N. For example, a first memory device 310A may include a plurality of memory areas allocated to two or more hosts (e.g., 102A, 102B, 102C, etc.). Operations or processes for allocating and releasing the plurality of memory areas will be described later with reference to FIGS. 6 to 8.

The memory system 300 may include a device allocation manager (memory management entity, MME) 330 configured to determine which of the plurality of memory areas included in the plurality of memory devices 310A, 310B, 310C, ..., 310Z is allocated or released based on a request input from the plurality of hosts 102A, 102B, 102C, ..., 102N. For example, the device allocation manager 330 may include a memory area table that records whether each of the plurality of memory areas included in the plurality of memory devices 310A, 310B, 310C, ..., 310Z is allocated to the plurality of hosts 102A, 102B, 102C, ..., 102N. The device allocation manager 330 can use a memory section table (or ownership information) 332 shown in FIG. 5 to recognize which host currently uses the plurality of memory areas or sections included in the plurality of memory devices 310A, 310B, 310C, ..., 310Z. Here, a size of each of the plurality of memory areas or sections may be determined in response to a request from the plurality of hosts 102A, 102B, 102C, ..., 102N.

According to an embodiment, because the device allocation manager 330 can recognize which host uses or accesses the memory area or section, the device allocation manager 330 can transfer a message transmitted from the plurality of CXL™ endpoints 320A, 320B, 320C, ..., 320N into the plurality of memory devices 310A, 310B, 310C, 310Z based on an identifier included in the message. When at least one from among the plurality of memory areas included in the plurality of memory devices 310A, 310B, 310C, ..., 310Z is allocated to a specific host, the host may recognize information (e.g., physical address, identifier, or etc.) regarding the allocated memory area or memory device. When the host transmits a command such as a read command, a write command, or an erase command to use or access the memory area, the host may transmit to the memory system 300 a message including the information regarding the allocated memory area or memory device along with the command. The memory system 300 may transfer the message to one among the plurality of memory devices 310A, 310B, 310C, ... 310Z, based on the identifier included in the message.

The plurality of memory areas or sections included in the plurality of memory devices 310A, 310B, 310C, ..., 310Z might not be permanently assigned to one of the plurality of hosts 102A, 102B, 102C, ..., 102N. For example, the first memory area or section is allocated to the first host 102A at a first time point, and the first memory area or section may be allocated to the second host 102B rather than the first host 102A at a second time point. That is, over time from the first time point to the second time point, an ownership of the first memory area or section may be changed from the first host 102A to the second host 102B. For this process, the first memory area or section is deallocated and allocated. When a host using the first memory area or section is changed (i.e., ownership is changed), the memory system 300 should delete all data that may remain in the first memory area or section for security. An example of a security erase task performed by a memory system is zeroization. Zeroization may include electronically deleting stored data, encryption keys, and credentials service providers (CSPs) by changing or deleting contents or data stored in a specific memory area to prevent data recovery. When the device allocation manager 330 allocates the first memory area or section in response to an allocation request of the second host 102B rather than the first host 102A, the device allocation manager 330 may determine that a security erase task is required for the first memory area or section which had been used by the first host 102A. The device allocation manager 330 may transmit a security erase task for the first memory area or section to security erase circuitry (or secure eraser) 340. After the security erase circuitry 340 completes security erase operation on the first memory area, the device allocation manager 330 may notify the second host 102B that the first memory area or section is assigned in response to the allocation request of the second host 102B.

The memory system 300 may include the security erase circuitry 340 that performs a security erase operation. The security erase circuitry 340 may store a security erase task for the first memory area in an erase job queue (or erase task queue) 342 shown in FIG. 5 according to deallocation determined by the device allocation manager 330. The security erase circuitry 340 may sequentially determine whether to perform a security erase operation included in the erase job queue 342 and may perform a security erase operation on a specific memory area when there is an executable security erase task in the erase job queue 342. For example, the security erase circuitry 340 may perform a security erase operation on a specific memory area or memory device 310A, 310B, 310C, . . . , 310Z corresponding to the security erase task included in the erase job queue 342, when any data input/output operation is not performed in the corresponding memory device (e.g., an idle state).

According to an embodiment, the security erase circuitry 340 may remove the security erase task stored in the erase job queue 342 when the first memory area or section is reallocated to the first host 102A that had an ownership before the assignment of the first memory area or section was released. For example, when a release request for the first memory area or section is received from the first host 102A, the device allocation manager 330 may deliver the security erase task for the first memory area or section to the security erase circuitry 340. Before the security erase circuitry 340 performs the security erase operation on the first memory area or section, the first host 102A may request memory section allocation. In response to a memory section allocation request, the device allocation manager 330 may reallocate the first memory section to the first host 102A. Because the first memory section had been used or accessed by the first host 102A, it may not be necessary to perform a security erase operation on the first memory section when the first memory area is reallocated to the first host 102A. When the device allocation manager 330 notifies the security erase circuitry 340 that the first memory section is reallocated to the first host 102A, the security erase circuitry 340 may remove the security erase task for the first memory section, which is scheduled but not performed, from the erase job queue 342. Then, the first memory section may be reallocated to the first host 102A, which is a same host, without security erase, i.e., in a state where the security erase operation has not been performed on the first memory section.

According to an embodiment, an ownership of a plurality of memory areas included in a plurality of memory devices 310A, 310B, 310C, . . . , 310Z can show which host among the plurality of host 102A, 102B, 102C, . . . , 102N currently uses each memory section (e.g., to which one of the plurality of host 102A, 102B, 102C, . . . , 102N each memory section is assigned). To check or track the change of ownership regarding the plurality of memory areas or section included in the plurality of memory devices 310A, 310B, 310C, . . . , 310Z, the device allocation manager 330 may store information about previous ownership and current ownership (or current ownership and next ownership). If the change in ownership is referred to as a CXL™ reset, the device allocation manager 330 may store ownership information before and after the CXL™ reset. The device allocation manager 330 may determine whether to perform a security erase operation by comparing ownership information before and after CXL™ reset. For example, if a specific memory area or section is reallocated to a same host (i.e., there is no ownership change), the security erase operation could be performed optionally. On the other hand, if the specific memory area is allocated to another host (i.e., if a change in ownership occurs), a mandatory security erase operation should be performed.

According to an embodiment, the device allocation manager 330 and the security erase circuitry 340 included in the memory system 300 may be applied to the fabric manager 130 described in FIG. 2. The plurality of logic devices 110A, 110B, 110C, 110D, . . . , 110 # connected to the CXL™ switch 120 might not include any component corresponding to the device allocation manager 330 and the security erase circuitry 340 capable of controlling security erase operation. The fabric manager 130 can perform a security erase operation on a logical device 110A, 110B, 110C, 110D, . . . , 110 # that corresponds to the PCI-to-PCI Bridge (PPB) 126, which is not connected (in an unbound state) in the CXL™ switch 120.

In addition, according to an embodiment, when one of the plurality of hosts 102A, 102B, 102C, . . . , 102N transmits an allocation request for a memory area or section, the fabric manager 130 or the memory system 300 may check whether the corresponding host has recently transferred a release request for a memory area or section based on ownership information. If it is confirmed based on the ownership information that the corresponding host has recently made a release request for a memory area or section, the fabric manager 130 or the memory system 300 may reallocate the recently released memory area or section in preference to the corresponding host.

Figure 5:
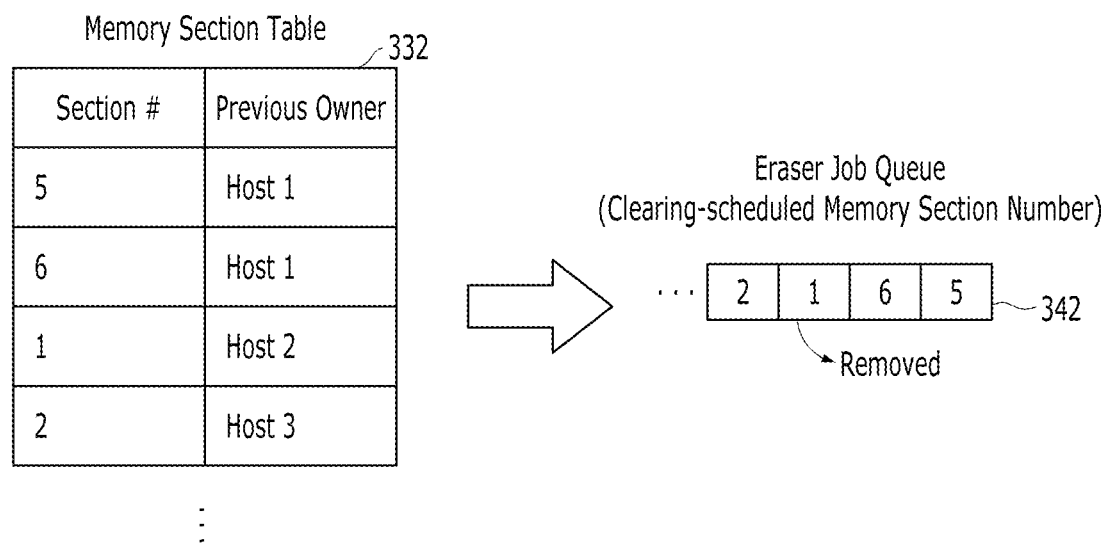
FIG. 5 illustrates an operation of a security erase device according to an embodiment of the present disclosure.

FIG. 5 illustrates an operation of a security erase device according to an embodiment of the present disclosure. Specifically, FIG. 5 describes operations of a device allocation manager 330 and a security erase circuitry 340 shown in FIG. 4.

Referring to FIGS. 4 and 5, the device allocation manager 330 may include the memory section table (or ownership information) 332, and the security erase circuitry 340 may include the erase job queue 342.

The memory section table 332 may include ownership information on each memory area distinguished by an identifier Section #. The ownership information may include previous ownership information. For example, fifth, sixth, first, and second memory areas (Section #: 5, 6, 1, 2) shown in FIG. 5 are currently not allocated to nor used by any host. The fifth, sixth, first, and second memory areas (Section #: 5, 6, 1, 2) are in a deallocated state. According to previous ownership information, the fifth and sixth memory areas (Section #: 5, 6) had been used by the first host (Host1) before deallocation, the first memory area (Section #: 1) had been used by the second host (Host2) before deallocation, and the second memory area (Section #: 2) had been used by the third host3 before deallocation.

The device allocation manager 330 can deliver security erase tasks for the fifth, sixth, first, and second memory areas (Section #: 5, 6, 1, 2) to the security erase circuitry 340 based on the deallocations. In the erase job queue 342 in the security erase circuitry 340, the security erase tasks for the fifth, sixth, first, and second memory areas (Section #: 5, 6, 1, 2) may be sequentially stored, and the security erase operations pending.

In the above-described situation, the second host (Host2) may request the memory system 300 to allocate a memory area. The device allocation manager 330 may check the memory section table 332 to recognize whether there is a memory area recently released from the second host (Host2). Referring to the memory section table 332, the device allocation manager 330 may recognize that the first memory area (Section #: 1) has recently been deallocated or released to the second host (Host2). Accordingly, the device allocation manager 330 may preferentially allocate the first memory area (Section #: 1) to the second host (Host2) and inform the security erase circuitry 340 that the first memory area (Section #: 1) has been preferentially reallocated to the second host (Host2). The security erase circuitry 340 may remove the security erase task for the first memory area (Section #: 1) that is pending in the erase job queue 342. Through this procedure, it is possible to skip the security erase operation for a specific memory area released from, and reallocated to, a same host, so that the specific memory area can be allocated more quickly to the host's allocation request.

Meanwhile, according to an embodiment, a security erase task included in the erase job queue 342 in the security erase circuitry 340 may be quickly performed. Even though the device allocation manager 330 reallocates a same memory area to a same host, it might be possible that the security erase task for the memory area may already be completed. In this case, the device allocation manager 330 may arbitrarily allocate any one of the memory areas in which the security erase operation has been completed, instead of reallocating the same memory area.

According to an embodiment, a memory area included in a logical device may include a plurality of volatile memory cells or a plurality of non-volatile memory cells. Security erase operations for the plurality of volatile memory cells may be selectively performed, but security erase operations for the plurality of non-volatile memory cells would be mandatorily performed. This is because data overwrite might not be supported in the plurality of non-volatile memory cells, unlike the plurality of volatile memory cells.

Figure 6:
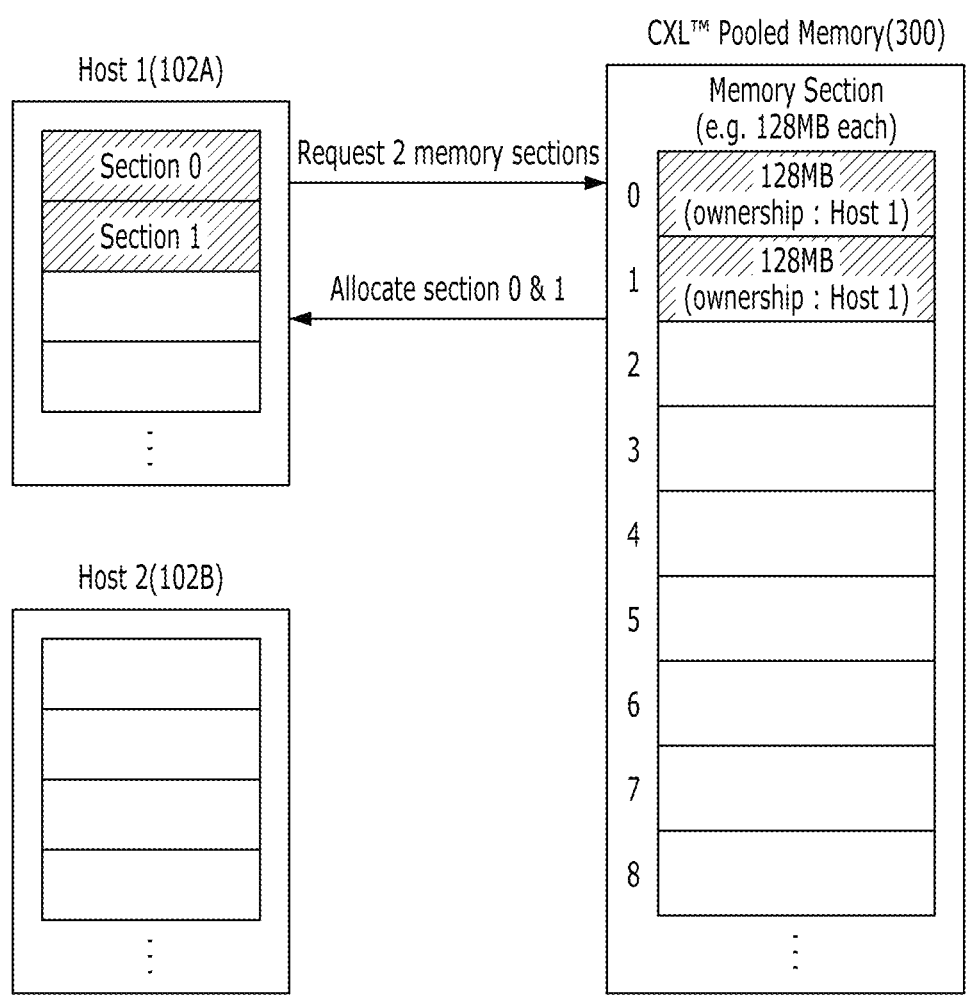
FIG. 6 illustrates a first example of memory area allocation and release according to an embodiment of the present disclosure.

FIG. 6 illustrates a first example of memory area allocation and release according to an embodiment of the present disclosure. Specifically, FIG. 6 illustrates a data processing device including a first host 102A, a second host 102B, and a memory system 300 as an example. According to an embodiment, the number of hosts and the number of memory systems may vary. The memory system 300 may include a Pooled Memory Device that can be shared by the plurality of hosts 102A, 102B.

Referring to FIG. 6, the first host 102A may transmit an allocation request for two memory sections (2 memory sections) to the memory system 300 (Request 2 memory sections). In response to the allocation request, the memory system 300 may allocate the first memory section 0 and the second memory section 1 to the first host 102A. The memory system 300 may inform the first host 102A that the first memory section 0 and the second memory section 1 are allocated (Allocate section 0 & 1).

Referring to FIG. 6, each of the plurality of memory sections in the memory system 300 may be 128 MB. According to an embodiment, each of the plurality of memory sections may have a same size.

According to an embodiment, a size of each of the plurality of memory sections may be different from each other. The memory system 300 may differently set the size of the allocated memory section in response to a request input from the first host 102A or the second host 102B.

Figure 7:
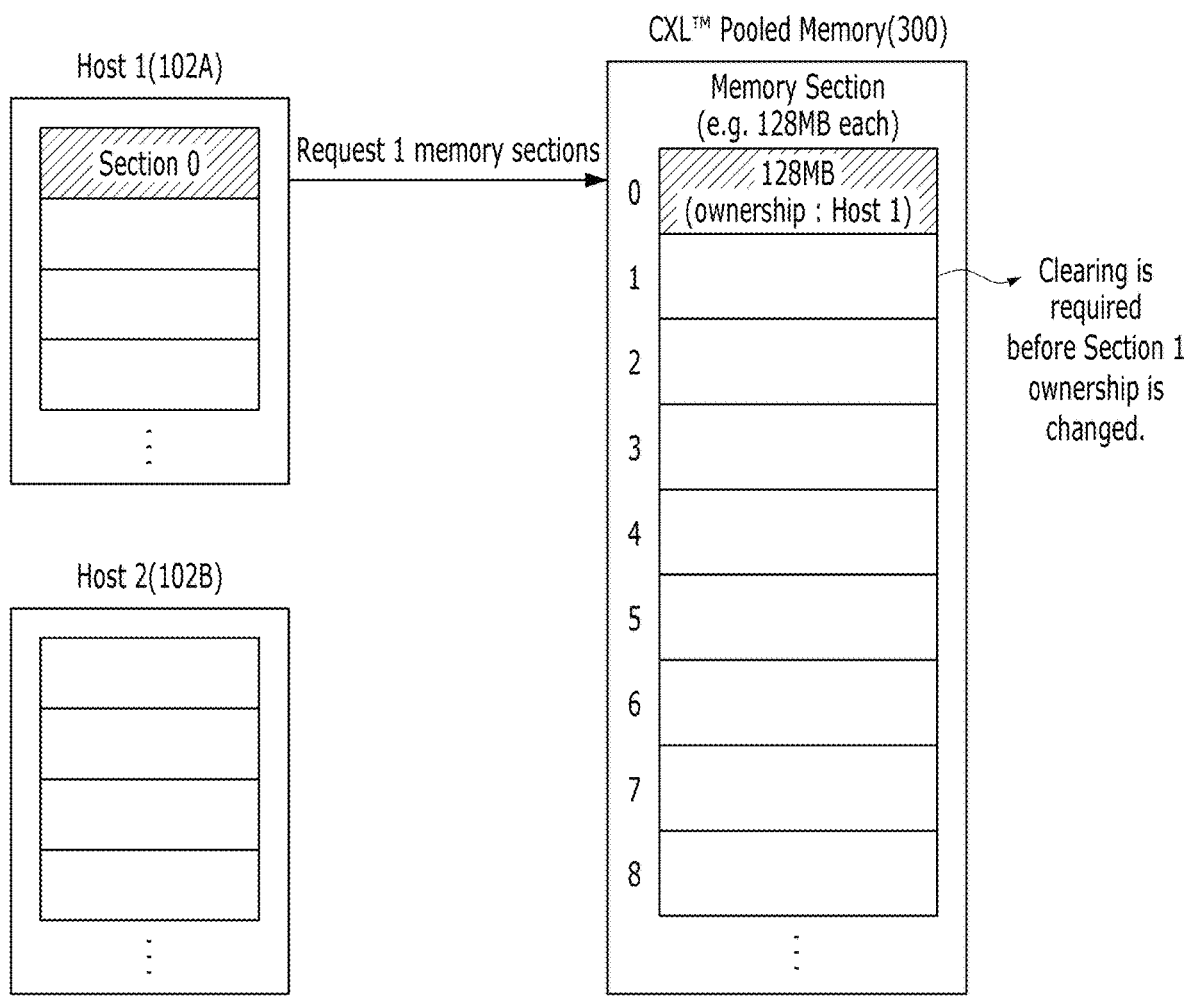
FIG. 7 illustrates a second example of memory area allocation and release according to an embodiment of the present disclosure.

FIG. 7 illustrates a second example of memory area allocation and release according to an embodiment of the present disclosure. FIG. 7 illustrates a first host 102A that transmits a release request for one memory section in the data processing device described in FIG. 6.

Referring to FIG. 7, the first host 102A may transmit a release request for one memory area (Release 1 memory section). The memory system 300 may deallocate the second memory section 1 among the first memory section 0 and the second memory section 1, which have been allocated to the first host 102A in response to the release request of the first host 102A.

After releasing the second memory section 1, the memory system 300 may perform a security erase operation (e.g., a zeroization operation) on the second memory section 1. The security erase operation may be performed before the ownership of the second memory section 1 is changed or the second memory section 1 is reallocated to another host.

Figure 8:
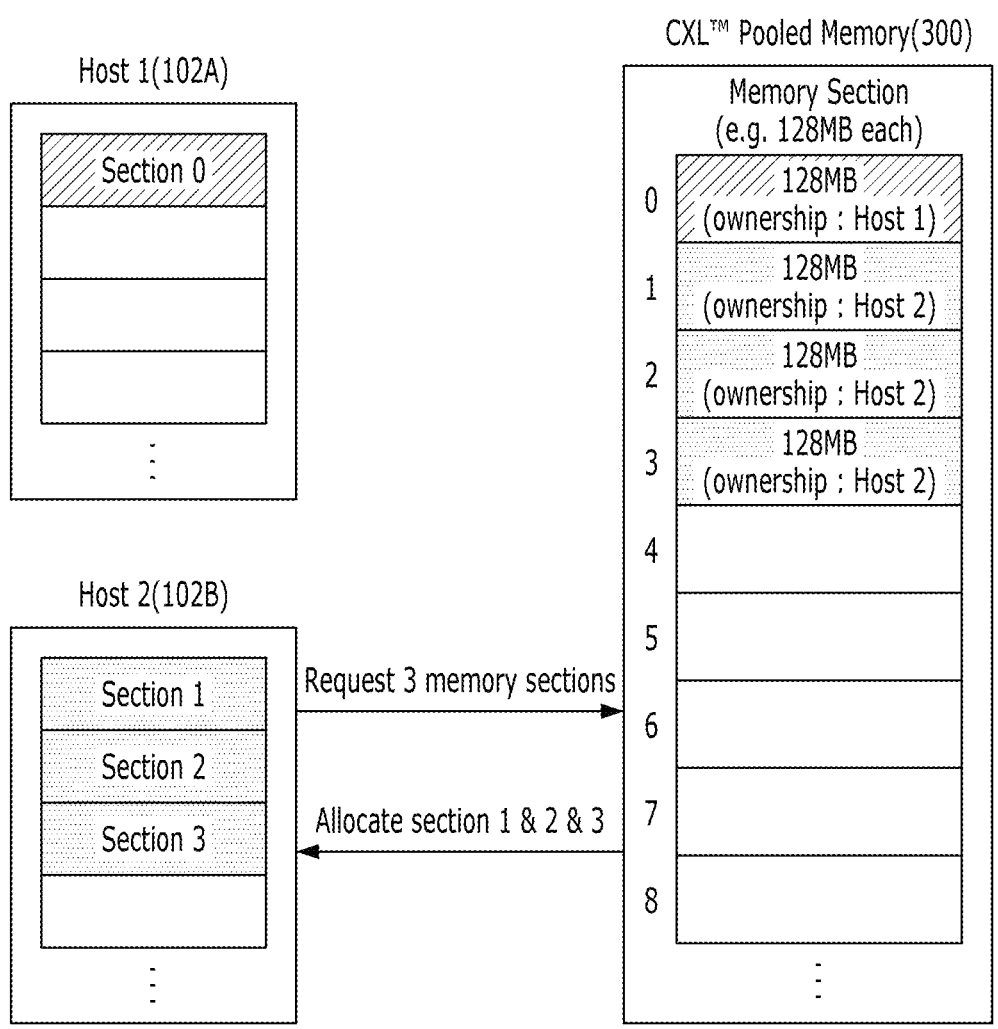
FIG. 8 illustrates a third example of memory area allocation and release according to an embodiment of the present disclosure.

FIG. 8 illustrates a third example of memory area allocation and release according to an embodiment of the present disclosure. FIG. 8 illustrates a second host 102B that transmits an allocation request for at least one memory section in the data processing apparatus described in FIG. 7.

Referring to FIG. 8, the second host 102B may transmit an allocation request for three memory areas to a memory system 300 (Request 3 memory sections). Since the security erase operation for a second memory area 1 has been completed, the memory system 300 may allocate the second, third, and fourth memory areas 1, 2, 3 to the second host 102B. The memory system 300 may inform the second host 102B that the second memory area 1, a third memory area 2, and a fourth memory area 3 are allocated (Allocate sections 1 & 2 & 3).

Referring to FIGS. 6 to 8, the memory system 300 may perform a security erase operation of the memory section and assign a memory section in which the security erase operation has been completed to the host.

According to an embodiment, referring to FIGS. 5 and 8, the first host 102A may request allocation of at least one memory area or at least one memory section before the second host 102B requests allocation of three memory sections to the memory system 300. In this case, the second memory area 1 may be reallocated to the first host 102A without performing the security erase operation described in FIG. 7.

As above described, a data processing device according to an embodiment of the present disclosure may selectively perform a security erase operation in a process of allocating a memory area in response to a request from a host, thereby improving operational performance by reducing a delay caused by the security erase operation.

In addition, a memory system according to an embodiment of the present disclosure can be connected to a plurality of hosts to allocate or release multiple memory areas in response to requests from the plurality of hosts to control resources available to the plurality of hosts.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods or operations of the computer, processor, controller, or other signal processing device, are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, control circuitry, devices, modules, units, multiplexers, generators, logic, interfaces, decoders, drivers, generators and other signal generating and signal processing features of the embodiments disclosed herein may be implemented, for example, in non-transitory logic that may include hardware, software, or both. When implemented at least partially in hardware, the controllers, processors, control circuitry, devices, modules, units, multiplexers, generators, logic, interfaces, decoders, drivers, generators and other signal generating and signal processing features may be, for example, any of a variety of integrated circuits including but not limited to an application-specific integrated circuit, a field-programmable gate array, a combination of logic gates, a system-on-chip, a microprocessor, or another type of processing or control circuit.

When implemented at least partially in software, the controllers, processors, control circuitry, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods or operations of the computer, processor, microprocessor, controller, or other signal processing device, are described in detail, the code or instructions for implementing the operations of the method embodiments may transform the computer, processor, controller, or other signal processing device into a special-purpose processor for performing the methods described herein.

While the present teachings have been illustrated and described with respect to the specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A memory system, comprising:
   at least one memory device including a plurality of memory areas;
   a device allocation manager configured to determine which of the plurality of memory areas is allocated or released based on a request input from at least one host; and
   security erase circuitry configured to store a security erase task for a first memory area, which is associated with a release determined by the device allocation manager, in an erase job queue, and to remove the security erase task from the erase job queue when the first memory area is reallocated to a first host to which the first memory area was allocated before the release.

2. The memory system according to claim 1, wherein, when the device allocation manager determines allocation of the first memory area to a second host, the device allocation manager notifies the second host that the first memory area is allocated after the security erase circuitry completes the security erase task for the first memory area.

3. The memory system according to claim 1, further comprising a plurality of computer to memory link-based endpoints, each endpoint selectively coupled to the at least one host.

4. The memory system according to claim 3, wherein a number of the plurality of computer to memory link-based endpoints is the same as a number of PCI-PCI bridges (PPBs) included in a computer to memory link-based switch coupled to both the memory system and the at least one host.

5. The memory system according to claim 3, wherein the device allocation manager is configured to transfer a message through the plurality of computer to memory link-based endpoints into a memory device corresponding to an identifier included in the message.

6. The memory system according to claim 1, wherein the security erase circuitry is configured to perform a security erase task in a memory device when the memory device does not perform a data input/output operation.

7. The memory system according to claim 1, wherein the security erase circuitry is configured to sequentially determine whether to execute, or delay, plural security erase tasks stored in the erase job queue and change an execution sequence of the plural security erase tasks.

8. The memory system according to claim 1, wherein the device allocation manager comprises a memory section table that records whether each of the plurality of memory areas included in the at least one memory device is allocated to the at least one host, and
   wherein a size of the plurality of memory areas allocated to the at least one host is determined based on a request input from the at least one host.

9. The memory system according to claim 8, wherein the at least one memory device comprises the plurality of memory areas allocated to a plurality of hosts.

10. A fabric manager coupled to at least one host and at least one logical device, comprising:
    a device allocation manager configured to determine which of a plurality of memory areas in the at least one logical device is allocated or released based on a request input from the at least one host; and
    security erase circuitry configured to store a security erase task for a first memory area included in the at least one logical device, which is associated with a release determined by the device allocation manager, in an erase task queue, and to remove the security erase task from the erase task queue when the first memory area is reallocated to a first host to which the first memory area was allocated before the release.

11. The fabric manager according to claim 10, wherein, when the device allocation manager determines allocation of the first memory area to a second host, the device allocation manager notifies the second host that the first memory area is allocated after the security erase circuitry completes the security erase task for the first memory area.

12. The fabric manager according to claim 10, wherein the security erase circuitry is configured to recognize a first logical device including the first memory area from among the at least one logical device and to determine whether to carry out the security erase task for the first memory area based on a connection state of a PCI-PCI bridge (PPB) corresponding to the first logical device.

13. The fabric manager according to claim 10, wherein the security erase circuitry is configured to perform a security erase task in the at least one logical device when the at least one logical device does not perform a data input/output operation.

14. The fabric manager according to claim 10, wherein the security erase circuitry is configured to sequentially determine whether to execute, or delay, plural security erase tasks stored in the erase task queue and to change an execution sequence of the plural security erase tasks.

15. The fabric manager according to claim 10, wherein the device allocation manager comprises a memory area table that records whether each of the plurality of memory areas included in the at least one logical device is allocated to the at least one host, and wherein the device allocation manager controls a connection relationship between at least one virtual PCI-PCI bridge (vPPB) and at least one PCI-PCI bridge (PPB) in a computer to memory link-based switch based on the memory area table.

16. A data processing system, comprises:
a plurality of hosts, each host including a root port; and
a memory system comprising: a plurality of computer to memory link-based endpoints corresponding to root ports of the plurality of hosts; a device allocation manager configured to determine which of a plurality of memory areas is allocated or released based on a request input from at least one host; and security erase circuitry configured to store a security erase task for a first memory area included in at least one logical device, which is associated with a release determined by the device allocation manager, in an erase job queue, and to remove the security erase task from the erase job queue when the first memory area is reallocated to a first host to which the first memory area was allocated before the release.

17. The data processing system according to claim 16, wherein, when the device allocation manager determines allocation of the first memory area to a second host, the device allocation manager notifies the second host that the first memory area is allocated after the security erase circuitry completes the security erase task for the first memory area.

18. The data processing system according to claim 16, wherein the device allocation manager is configured to transfer a message through the plurality of computer to memory link-based endpoints into a memory device corresponding to an identifier included in the message.

19. The data processing system according to claim 16, wherein the security erase circuitry is configured to perform a security erase task in the at least one logical device when the at least one logical device does not perform a data input/output operation.

20. The data processing system according to claim 16, wherein the device allocation manager comprises a memory section table that records whether each of the plurality of memory areas included in at least one memory device is allocated to the at least one host, and wherein a size of the plurality of memory areas allocated to the at least one host is determined based on a request input from the at least one host.

* * * * *